March 19, 1929.　　　　K. MARTIN　　　　1,706,177
LENS
Filed June 30, 1927　　　3 Sheets-Sheet 1
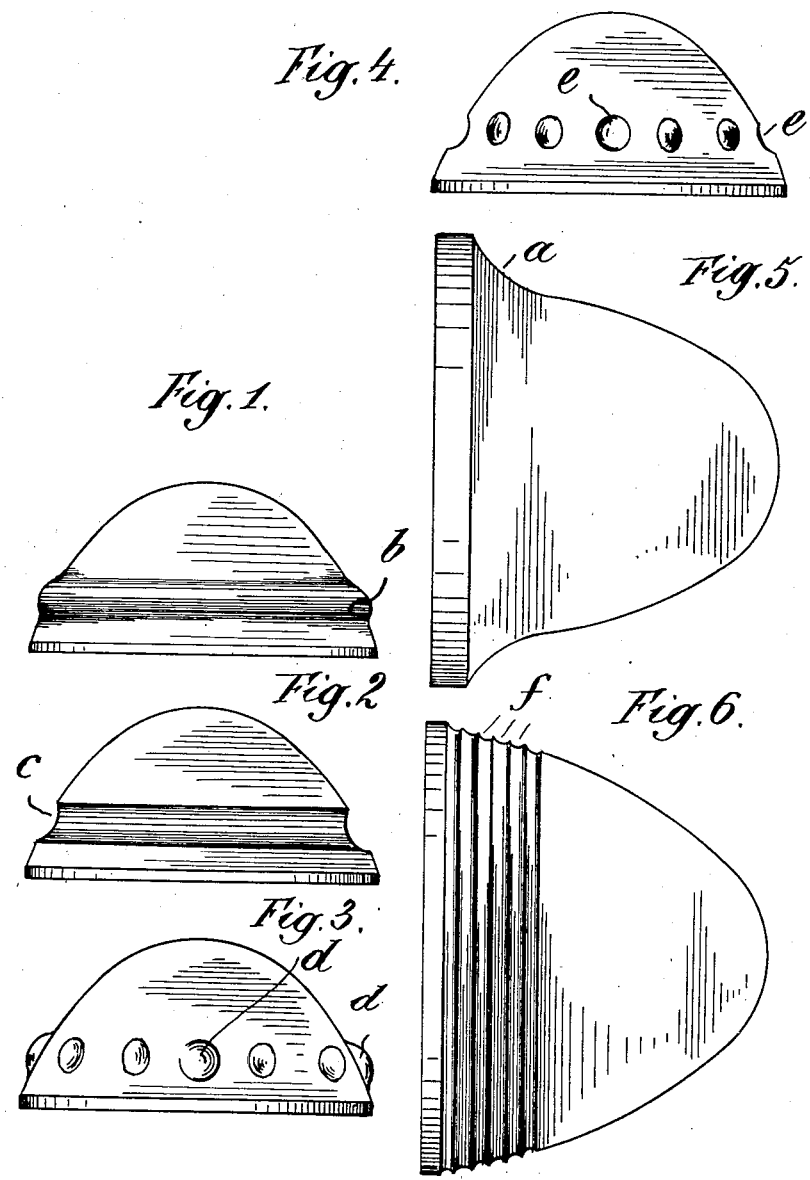

March 19, 1929. K. MARTIN 1,706,177
LENS
Filed June 30, 1927 3 Sheets-Sheet 2

Inventor
Karl Martin
By Knight Bros
Attys

March 19, 1929.  K. MARTIN  1,706,177
LENS
Filed June 30, 1927  3 Sheets-Sheet 3

Inventor
Karl Martin

Patented Mar. 19, 1929.

1,706,177

UNITED STATES PATENT OFFICE.

KARL MARTIN, OF RATHENOW, GERMANY.

LENS.

Application filed June 30, 1927, Serial No. 202,712, and in Germany September 7, 1926.

In lighting devices, such as signal lamps, searchlights and the like, it is necessary in the most cases to use dioptric systems to collect the light emitted from the source of light. In order to obtain the greatest possible angle of aperture in dioptric systems of this type, it is necessary to employ systems consisting of several parts or so-called ring lenses of the Fresnel type. In both these cases, the optical installation is rather costly, unless one contents oneself with the quite ordinary pressed ring lenses, which have a very low efficiency due to their nature.

Now it is already known to employ lenses the convex side of which has a so-called deformed surface, that means, the spherical surface of which has several radii of curvature. By suitably selecting these radii of curvature, a favorable angle of aperture of about 120 degrees is obtained with such lenses, it is true, but with signal lamps frequently the condition is to be fulfilled, that for instance a person standing below a signal or laterally before it, is able to discern whether the lamp is lighting or not or, that in railway service the driver of a train running toward the signal is able to discern the latter even when the line is not straight but curved. If now the diffusion of the light generally would be chosen to be so great as to allow for this requirement, the collecting action of the lighting system would completely get lost therewith.

In order to fulfil this condition without interfering with the collecting action of the system, according to my invention the lens body is so deformed in several places on one or both sides, that, without interfering to a noticeable extent with the axial emission, a lateral emission is obtained that may be discerned by a person standing aside or below the signal.

The drawings illustrate by way of example some embodiments of lens bodies designed in accordance with my invention and in which the curved surface is aspherical, that means, shows on different places different radii of curvature.

Figures 1–6 illustrate in elevation one type of lens contemplated by my invention.

Figure 7:
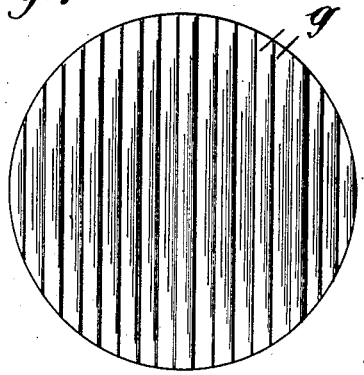
Figures 7–13 illustrate another type, Figure 7 being a plan view of the bottom and Figures 8–13 being elevations of lenses embodying my inventive idea.
Figure 11:
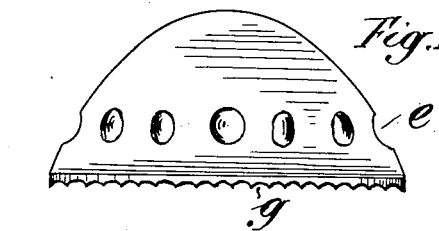
Figure 12:
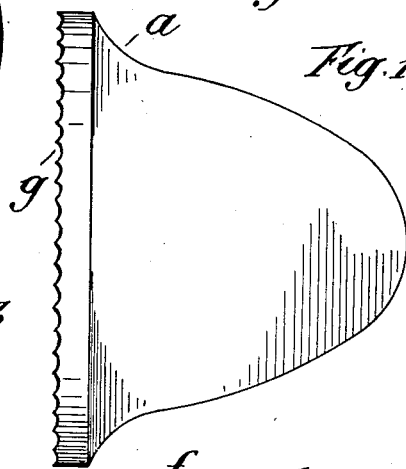
Figure 8:
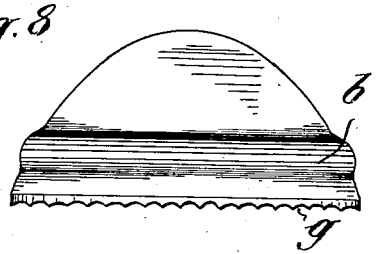
Figure 9:
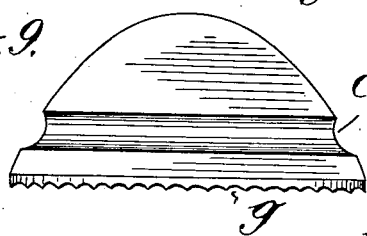
Figure 13:
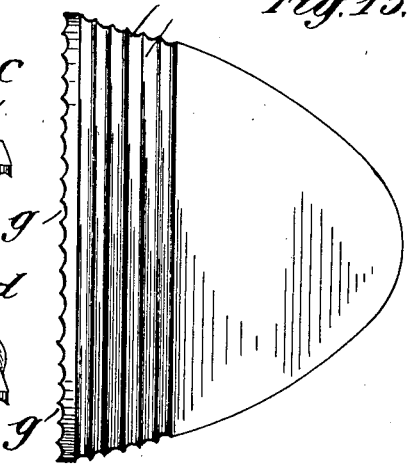
Figure 10:
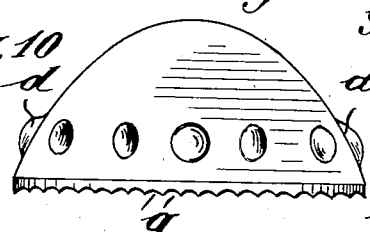
Figure 14:
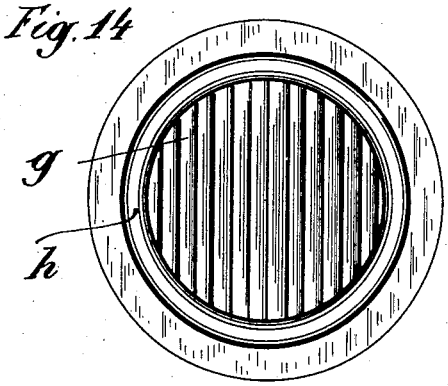
Figure 18:
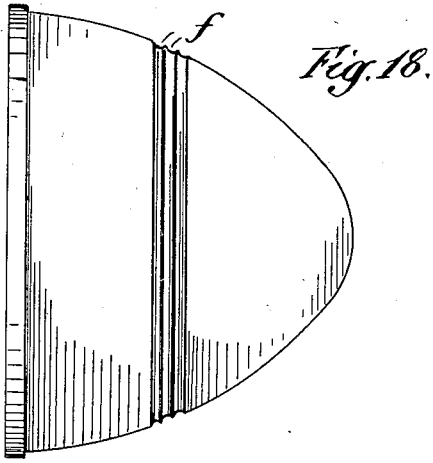
Figure 15:
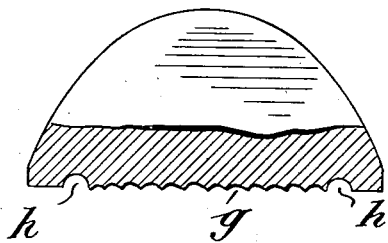
Figure 16:
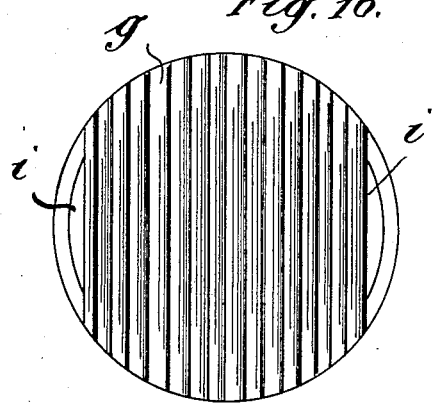
Figure 17:
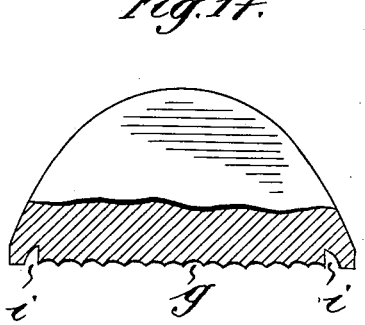

Figures 14–18 represent still another type, Figures 14 and 16 being bottom plan views and Figures 15, 17 and 18 being elevations, Figures 15 and 17 representing the lenses partly in section.

In the embodiment illustrated in Figs. 1 to 6 the flat side of the lens body has not been altered, but the highly convex surface thereof is provided preferably near its edge, where axial rays are not emitted owing to the total reflection, that is in the zone which cannot be utilized for axial emission, with a laterally emitting means that enables a person standing aside or below the signal to discern whether the signal is lighting or not.

In the embodiment illustrated in Fig. 1 the convex surface of the lens is provided near its edge with a convex annular bunch $b$, whilst the lens shown in Fig. 2 has a concave annular groove $c$. In both these lenses an annular beam of rays will be emitted near the edge of the lens independently of the axially emitted main beam.

In the embodiment illustrated in Fig. 3 the convex surface of the lens carries near its edge wart-like, that is convex projections $d$, whilst in Fig. 4 is it provided with concave cup-shaped cavities $e$. A coronal beam of convergent rays will therefore be emitted around the axial main beam of rays by the lens of Fig. 3, and a similar beam of divergent rays will be emitted by the lens of Fig. 4.

In the embodiment shown in Fig. 5 the zone which does not enter into consideration for the axial emission, is concave and thus forms an annular groove $a$.

In the embodiment illustrated in Fig. 6 the curvature of the convex surface is not broken, but the respective zone thereof possesses a plurality of annular small grooves $f$. As shown in Fig. 18, these grooves may also be disposed on another place of the convex surface, for instance in its midst, as shown. In these three cases the lens will emit, besides its axial beam of rays, a laterally diffusing coronal beam, so that the above-mentioned condition is fulfilled.

Furthermore, both surfaces of the lens may be used simultaneously to emit lateral rays, by providing both projections or cavities as shown in Figs. 1 to 6 and 18 on the convex surface and laterally emitting cavities on the flat side of the lens, as for instance illustrated in Figs. 7 to 17. In this case the flat side may carry, as shown in Figs. 7 to 13, parallel concave or convex small grooves $g$, and the convex surface may have an annular bunch $b$ or groove $c$ as in Figs. 1 to 6 or wart-shaped convex projections $d$ or concave cavities $e$, Fig. 11, or near its edge a groove $a$, Fig. 12, or a series of small grooves, $f$, Fig. 13.

Finally, as shown in Figs. 14 and 15, merely the flat side of the lens may have near its edge an annular groove $h$ and within this groove the above-described parallel straight-lined small grooves $g$ or, as illustrated in Figs. 16 and 17, the flat side may be provided with straight-lined parallel small grooves $g$ on the right and left of which is provided a crescent-shaped engraving $i$ acting as a portion of a lens. In all these cases the deformation alone of the flat side will cause the production or increase of the circular or lateral emission of rays, without interfering to a noticeable extent with the main axial emission of light. Consequently the engine driver of a train approaching the signal on a curved track is enabled to discern in good time the signal, and a person standing aside or below the signal is capable to see whether the lamp is lighting or not.

What I claim as my invention and desire to secure by Letters Patent, is:—

A lens having an outer convex aspherical surface and an inner flat one and one or more annular concavities in said outer surface near its edge.

In testimony whereof the foregoing specification is signed.

KARL MARTIN.